United States Patent [19]

Spinnler

[11] Patent Number: 4,857,175
[45] Date of Patent: Aug. 15, 1989

[54] CENTRIFUGAL DEBRIS CATCHER

[75] Inventor: Ralph F. Spinnler, Glastonbury, Conn.

[73] Assignee: Teleco Oilfield Services Inc., Meriden, Conn.

[21] Appl. No.: 72,129

[22] Filed: Jul. 9, 1987

[51] Int. Cl.$^4$ .............................................. B07B 1/18
[52] U.S. Cl. ...................................... 209/235; 175/66; 175/320; 175/323; 209/250; 209/273; 209/305; 209/17; 210/460; 210/461; 210/512.3
[58] Field of Search ............... 209/235, 236, 250, 254, 209/273, 270, 285, 286, 305, 931, 373, 243, 17, 211; 210/460, 461, 462, 463, 512.3; 175/66, 320, 323, 312; 239/399, 590, 590.3, 462, DIG. 23

[56] References Cited
U.S. PATENT DOCUMENTS

| | | | |
|---|---|---|---|
| 9,724 | 5/1881 | Cole | 175/323 |
| 1,524,471 | 1/1925 | Benckenstein | 175/320 |
| 1,585,771 | 5/1926 | Crabb | 209/235 |
| 1,961,921 | 6/1934 | Bowen | 209/250 |
| 3,468,387 | 9/1969 | Benson | 175/323 |
| 3,481,475 | 12/1969 | Ruthrof et al. | 209/305 |
| 3,727,377 | 4/1973 | Chapman | 209/211 |
| 3,754,609 | 8/1973 | Garrett | 175/323 |
| 3,831,753 | 8/1974 | Gaylord et al. | 175/320 X |
| 3,895,930 | 7/1975 | Campolong | 55/394 |

FOREIGN PATENT DOCUMENTS

| | | | |
|---|---|---|---|
| 291027 | 7/1899 | France | 209/235 |
| 929233 | 5/1982 | U.S.S.R. | 209/17 |
| 1583933 | 8/1977 | United Kingdom . | |
| 2034609 | 10/1979 | United Kingdom . | |
| 2128905 | 10/1983 | United Kingdom . | |

Primary Examiner—Robert B. Reeves
Assistant Examiner—Donald T. Hajec
Attorney, Agent, or Firm—Fishman, Dionne & Cantor

[57] ABSTRACT

A debris catcher comprising a conical screen (filter) in a drill string which defines an annular accumulation space between the screen and the inner wall of the drill string is presented. The central portion of the screen is open to establish an unimpeded flow path. A centrifugal deflector, impeller or similar device above (upstream from) the screen establishes a helical flow pattern in the drilling mud whereby debris entrained in the mud is forced outwardly by centrifugal action. The debris is then caught in the annular accumulation space between the screen and the drill string wall when the mud flows through the screen. If the accumulator fills or the screen becomes clogged, mud will still flow through the center flow passage. The debris catcher of the present invention is preferably positioned within a drill string upstream of a mud powered turbine or other device in the mud stream, the operation of which may be jeopardized by debris in the mud stream.

29 Claims, 3 Drawing Sheets

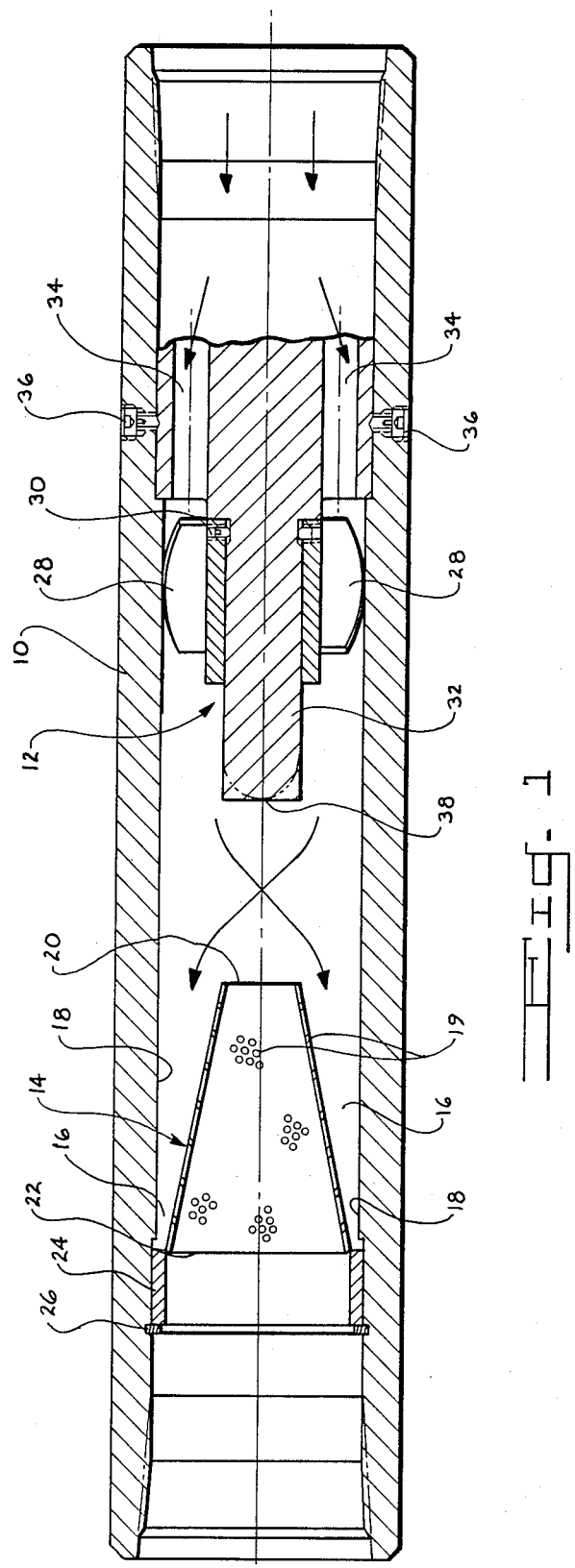

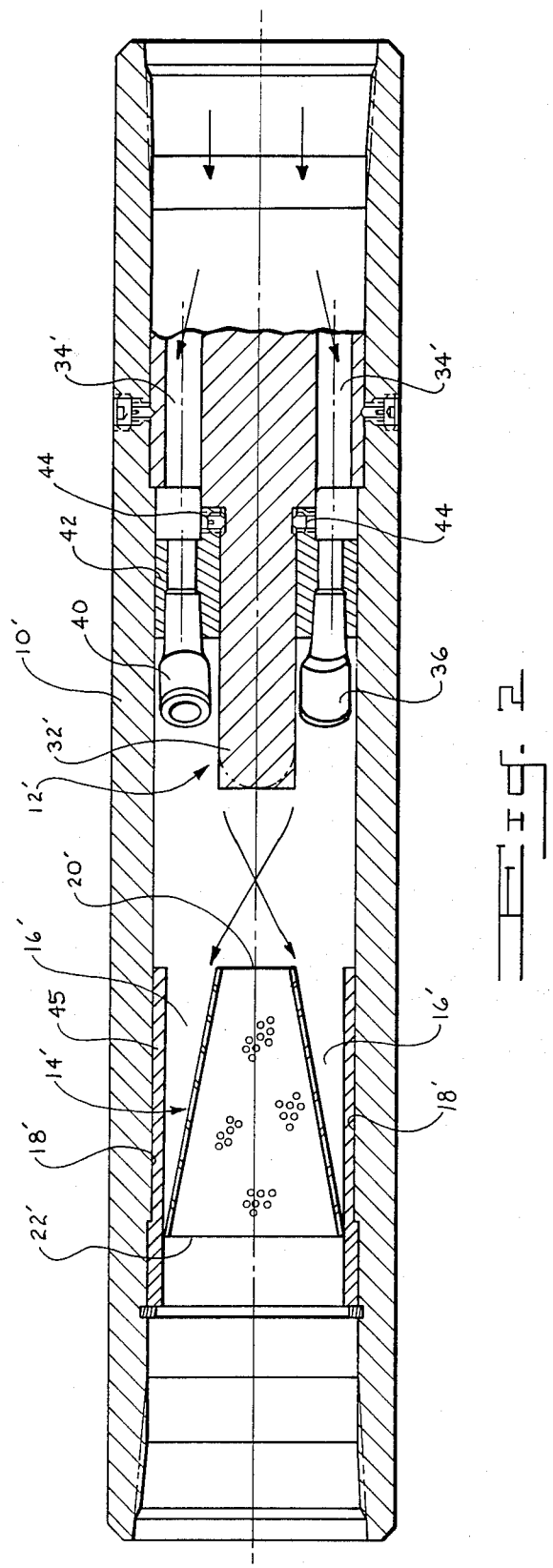

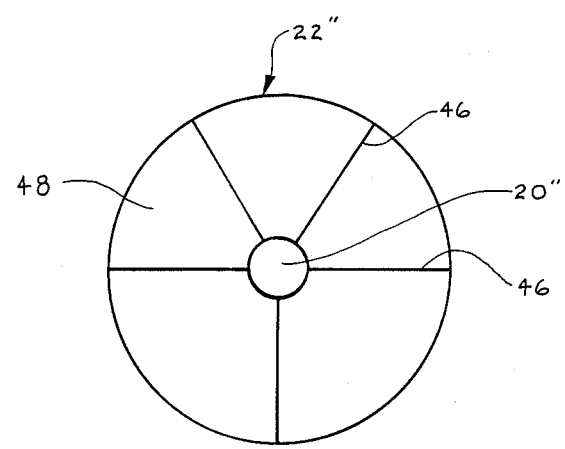

CENTRIFUGAL DEBRIS CATCHER

BACKGROUND OF THE INVENTION

This invention relates generally to a device for collecting and filtering foreign matter and debris from drilling mud flowing through a drill string. More particularly, this invention relates to a debris catcher and filter positioned downhole within the drill string upstream of a mud powered turbine (or other downhole device, the operation of which might be jeopardized by debris in the mud stream) to collect and filter miscellaneous debris from the drilling mud prior to its entering the turbine, while still permitting large quantities of lost circulation material to pass therethrough.

A well-known problem in the oil well drilling and related fields has been the undesirable presence of foreign matter and debris in the drilling mud which flows through a drill string. Such debris will act to jam or disrupt instrumentation and other devices in the drill string. Surface operated devices, such as desanders or filters, are known for filtering the mud at the surface. However, these surface devices do not solve the problem of debris which enters the mud downstream from the surface equipment, such as, for example, debris which breaks loose from the inner surface of the pipe.

Measurement-while-drilling (MWD) system which use mud powered turbines to generate power downhole are face with a particularly serious problem from foreign matter in drilling mud. It is well-known that such mud powered turbines are subject to field failure when debris in the drilling mud lodges in the turbine to jam or prevent the turbine rotor from rotating. While prior art filters or debris catchers are known, in many cases the drilling operator resists installing such known filters or debris catchers in the drill string because of a concern that the filter may become clogged if lost circulation material is pumped downhole. A clogged filter acts to halt circulation of drilling mud and leads to even more serious problems than those problems discussed above with regard to the existance of debris in the drilling mud. In other words, an operator would rather have debris in the drilling mud than take a chance that by using a filter, the filter would become clogged and hence, the drilling mud would cease to circulate.

Because of this fear of clogged debris catchers or filters, prior art devices (fishing plugs) have been provided for retrieving a part of the filtering apparatus should it become clogged. In that case, by retrieving the filtering apparatus, an opening will be provided for the passage of mud. However, even those debris catchers which provide means for retrieving a part of the filtering apparatus are unacceptable to many MWD users because of a concern that operating circumstances may make it impractical to retrieve a fishing plug and thereby open a flow area through the debris catcher.

SUMMARY OF THE INVENTION

The above described and other problems and drawbacks of the prior art are overcome or alleviated by the centrifugal debris catcher of the present invention. In accordance with the present invention, a debris catching apparatus located downhole is provided which will catch debris with a reasonable degree of certainty (but not absolute certainty) and will permit the passage of large amounts of lost circulation material (drilling mud) without reliance upon fishing plugs or other similar means for opening a flow area.

The debris catcher includes a conical screen (filter) in the drill string which defines an annular accumulation space between the screen and the inner wall of the drill string. The central portion of the screen is open to establish an unimpeded flow path. An impeller or similar device above i.e., upstream from, the screen establishes a helical flow pattern in the drilling mud whereby debris entrained in the mud is forced outwardly by centrifugal action. The debris is then caught in the annular accumulation space between the screen and the drill string wall when the mud flows through the screen. If the accumulator fills or the screen becomes clogged, mud will still flow through the center flow passage. The debris catcher of the present invention is positioned at a downhole location within the drill string upstream and preferably in the immediate proximity of a mud powered turbine.

The above described and other features and advantages of the present invention will be appreciated to and understood by those skilled in the art from the following detailed description and drawings.

BRIEF DESCRIPTION OF THE DRAWINGS

Referring now to the drawings wherein like elements are numbered alike in the several figures:

FIG. 1 is a cross-sectional elevation view of a debris catcher mounted in a drill string in accordance with the present invention;

FIG. 2 is a cross-sectional elevation view, similar to FIG. 1, of a second embodiment of a debris catcher in accordance with the present invention; and FIG. 3 is a plan view of a filter for use in conjunction with the present invention.

DESCRIPTION OF THE PREFERRED EMBODIMENT

Referring first to FIG. 1, a debris catcher in accordance with the present invention is shown mounted in a segment of a cylindrical drill collar 10. The debris catcher is generally comprised of two elements mounted in drill segment 10 including (1) means 12 for imparting a helical motion to drilling mud flowing through the drill segment; and (2) a conical screen 14 which defines an annular accumulation space 16 between screen 14 and the inner wall 18 of drill string segment 10. Screen 20 has flow holes 19, and the central portion 20 of screen 14 is open to establish an unimpeded flow path for the drilling mud. Filter 14 is mounted at its base 22 on a filter ring 24; with filter ring 24 being held in place in drill string 10 by retainer ring 26. While filter 14 is shown as conical, it could also be of other shapes, e.g, cylindrical, as long as it defines an annular accumulation space between the filter and the inner wall of the drill string.

It will be appreciated that any suitable apparatus for imparting a helical motion to the drilling mud may be used in accordance with the debris catcher of the present invention. In the example shown in FIG. 1, an impeller comprised of a series of angled blades or vanes 28 is utilized to impart the helical motion. Blades 28 are mounted by suitable connectors 30 (socket set screws) to a diffuser shaft 32. Diffuser shaft 32 includes a plurality of annularly arranged openings 34 therethrough which are aligned with each of the vanes 28. Shaft 32 is keyed to drill string 10 by suitable socket set screws or other connecting devices 36. The protruding tip 38 of shaft 32 may have any suitable shape including the square shape shown (or the rounded shape indicated by the dotted lines). Thus, when drilling mud flows through annularly spaced openings 34 of shaft 32, the mud will strike vanes 28 whereby a helical flow pattern will be imparted to the mud as indicated by the arrows in FIG. 1.

Drill string segment 10 shown in FIG. 1 will be located downhole in a drill string. Preferably, drill segment 10 is located immediately upstream of a mud powered turbine (or other apparatus which may be jeopardized by debris) for filtration and collection of any debris in the mud prior to its reaching the turbine rotors and thereby jamming or preventing the rotors from rotating. As mentioned, the impeller device comprising vanes 28 mounted on diffuser shaft 32 will impart a helical flow pattern to the drilling mud flowing through the drill string towards the mud powered turbine. The resultant centrifugal action of the flowing mud will force any debris towards the outer diameter of drill string 10 (against inner wall 18). The debris is then caught in the annular accumulation space 16 between screen 14 and inner drill string wall 18, while the mud will continue to flow both through opening 22 and through holes 19 in screen 16.

An important feature of the present invention is that if accumulator space 16 becomes filled or if screen 14 becomes clogged, drilling mud will continue to flow through center opening 22 thus providing uninterrupted flow of power fluid to the turbine. This is in distinct contrast to prior art debris catchers which, upon becoming filled or clogged, preclude any further mud flow therethrough; which in turn precludes further rotation of the turbine rotors.

As mentioned, the present invention contemplates any suitable means for creating a helical flow pattern to the flowing drilling mud including the vane impellers of FIG. 1 or any other device located along the center line of the mud column or along the bore of the drill collar which would impart such helical motion and centrifugally force debris to the outside of the drill string i.e., inner wall 18 of drill string 10. One such alternative method of creating a helical flow pattern is shown in FIG. 2. It will be appreciated that those elements which are similar or identical to the elements of FIG. 1 are similarly identified in FIG. 2 with the addition of a prime (') superscript. In the FIG. 2 embodiment, a plurality of angled or bent nozzles 40 are used to direct the flow of mud through openings 34' in a helical path rather than the vane structure 28 of FIG. 1. As with vanes 28, nozzles 40 are annularly mounted about central shaft 32'. A retaining block 42 is keyed to shaft 32' via a socket set screw or other connecting device 44.

A protective sleeve 45 may be provided along inner wall 18' of drill string segment 10' around screen 14' to prevent excessive abrasiveness and erosion caused by the swirling and agitated debris caught in annuular space 18'. Sleeve 42 may be comprised of any suitably hard material such as tungsten carbide. A rubber liner may also be used to preclude such abrasion. This sleeve or liner may also be incorporated in the embodiment of FIG. 1.

In another preferred embodiment shown in FIG. 3, the conical filter 14" may be provided with vanes 46 at base 22' thereof to segment the exterior of filter 14" and form pockets 48. Pockets 48 act to trap the swirling debris and thereby lessen or altogether avoid the problems associated with abrasion and erosion from the swirling debris.

The debris catching device of the present invention has been tested and shown to be very successful in both a horizontal and vertical mode catching over 99% of the foreign particles added to the drilling mud. In these tests, means of both the types shown in FIG. 1 and FIG. 2 for creating a helical flow pattern were utilized.

The testing utilized plastic, glass, and steel balls, and gravel which were introduced into a circulating mud stream pumped through the test apparatus. The characteristics of this artificial debris are listed in Table 1.

TABLE 1

| MATERIAL | ARTIFICIAL DEBRIS | | |
| --- | --- | --- | --- |
| | DENSITY | DIAMETER | QTY. |
| Soda-lime glass balls | 2.13 | 4 mm | 40 |
| Soda-lime glass balls | 2.13 | 7 mm | 40 |
| Carbon steel balls | 7.88 | ⅛ in. | 40 |
| Carbon steel balls | 7.88 | ¼ in. | 40 |
| Nylon balls | 1.40 | ⅛ in. | 40 |
| Nylon balls | 1.40 | ¼ in. | 40 |
| Polypropylene balls | 0.94 | ⅛ in. | 40 |
| Polypropylene balls | 0.94 | ¼ in. | 40 |
| Gravel | 2.65 | ⅛ in. | 40 |
| Gravel | 2.65 | ¼ in. | 40 |
| Gravel | 2.65 | ⅜ in. | 15 |
| | | TOTAL | 415 |

Pressure gauges and a flow meter were used to measure the flow variables during the tests. Both the vane type (FIG. 1) and the nozzle type (FIG. 2) diffuser systems were tested in vertical and horizontal positions.

During each of tests, 415 debris particles (Table 1) were introduced into the fluid stream pumped to the filter. The debris caught by the filter was then counted after each test as shown in Table 2.

The tests were very successful, with the downhole filter of the present invention catching 99.8 percent of the debris particles (i.e., 2484 out of 2490 particles). The few balls that passed the screen apparently did so due to turbulence created when the flow was turned off. This was confirmed by turning the pump on and off 10 times and noting that an average of 1 ball passed the screen each time the pump was turned off.

A test was conducted with no diffuser blades or nozzles. In this test, the fluid flowed axially through the filter with no swirling action. During this test 13 of the 415 particles passed through the filter, compared to an average of 1 particle passing with the diffuser blades or nozzles, indicating that the swirling action of the fluid definitely helps the filtering process.

The length of the outer drill segment in Tests 1-5 was 2 feet. During Test 6, the segment length was increased to 4 feet to determine if the added length would affect the filter performance. The longer filter worked equally well, allowing only one particle to pass.

Flow tests were conducted to measure the pressure drop across the filter with water circulation. The pressure drops were very low, ranging up to 8 psi with the vane-type diffuser (FIG. 1) and up to 15 psi with the tube-type diffuser (FIG. 2), as shown in Table 3.

TABLE 2

| | | DOWNHOLE FILTER TEST RESULTS | | | | | |
|---|---|---|---|---|---|---|---|
| TEST NO. | DIFFUSER TYPE | FILTER ORIENTATION | FILTER LENGTH (Ft.) | FLOW RATE (gpm) | PRESSURE DROP (psi) | BALLS CAUGHT | BALLS PASSED | |
| 1 | Vane | V | 2 | 350 | 6 | 413 | 2 | (4 mm Glass) |
| 2 | Vane | V | 2 | 390 | 8 | 414 | 1 | (¼ Polypropylene) |
| 3 | Nozzle | V | 2 | 370 | 14 | 414 | 1 | (¼ Nylon) |
| 4 | Vane | H | 2 | 413 | 8 | 414 | 1 | (¼ Nylon) |
| 5 | Nozzle | H | 2 | 400 | 15 | 415 | 0 | — |
| 6 | Vane | H | 4 | 400 | 8 | 414 | 1 | (¼ Polypropylene) |
| | | | | | | 2484 | 6 | |

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. Apparatus for catching debris in fluid flowing through a pipe segment comprising:
    means for imparting a helical flow pattern to the fluid; and
    filter means spaced downstream from said helical flow pattern imparting means, said filter means extending axially along said pipe segment and defining an annular accumulation space between the pipe segment and said filter means, said filter means having spaced apart first and second open ends and said filter means being conical and tapering outwardly from the end closest to said means for imparting a helical flow pattern.

2. The apparatus of claim 1 wherein said means for imparting a helical flow pattern to the fluid comprises:
    shaft means in said pipe segment having a plurality of openings therethrough; and
    blade means on said shaft means communicating with said openings, said blade means being angularly positioned to impart a helical flow pattern to fluid flowing through said openings.

3. The apparatus of claim 1 wherein said means for imparting a helical flow pattern to the fluid comprises:
    shaft means in said pipe segment having a plurality of openings therethrough; and
    nozzle means on said shaft means communicating with said openings, said nozzle means being angularly positioned to impart a helical flow pattern to fluid flowing through said openings.

4. The apparatus of claim 1 including:
    sleeve means along said pipe segment in said annular space to reduce abrasion of said pipe segment.

5. The apparatus of claim 4 wherein:
    said sleeve means is tungsten carbide.

6. The apparatus of claim 4 wherein:
    said sleeve means is rubber.

7. The apparatus of claim 1 wherein:
    said filter means is comprised of a metal mesh.

8. The apparatus of claim 1 wherein said filter means has an interior and an exterior and wherein said filter means further includes:
    means on said filter means exterior to define a plurality of pockets for retaining the filtered debris.

9. An apparatus for catching debris in drilling mud flowing through a drill collar segment comprising:
    means for imparting a helical flow pattern to the flowing drilling mud; and
    filter means spaced downstream from said helical flow pattern imparting means, said filter means extending axially along said pipe segment and defining an annular accumulation space between the drill collar segment and said filter means, said filter means having spaced apart first and second open ends and said filter means being conical and tapering outwardly from the end closest to said means for imparting a helical flow pattern.

10. The apparatus of claim 9 wherein said means for imparting a helical flow pattern to the flowing drilling mud comprises:
    shaft means in said drill collar segment having a plurality of openings therethrough; and
    blade means on said shaft means communicating with said openings, said blade means being angularly positioned to impart a helical flow pattern to drilling mud flowing through said openings.

11. The apparatus of claim 9 wherein said means for imparting a helical flow pattern to the drilling mud comprises:
    shaft means in said drill collar segment having a plurality of openings therethrough; and
    nozzle means on said shaft means communicating with said openings, said nozzle means being angularly positioned to impart a helical flow pattern to drilling mud flowing through said openings.

12. The apparatus of claim 9 including:
    sleeve means along said drill collar segment in said annular space to reduce abrasion of said drill collar segment.

13. The apparatus of claim 12 wherein:
    said sleeve means is tungsten carbide.

14. The apparatus of claim 12 wherein:
    said sleeve means is rubber.

15. The apparatus of claim 9 wherein:
    said filter means is comprised of a metal mesh.

16. The apparatus of claim 9 wherein said conical filter means includes:
    vanes on said filter means exterior to define a plurality of pockets.

17. An apparatus for catching debris in drilling mud flowing through a drill collar segment comprising:
    filter means, said filter means extending axially along said drill collar segment and defining an annular accumulation space between the drill collar segment and said filter means, and said filter means having spaced apart first and second open ends; and
    means for imparting a helical flow pattern to the flowing drilling mud, said helical flow pattern imparting means being spaced upstream of said filter means, said filter means tapering outwardly from the end closest to said helical flow pattern imparting means.

18. The apparatus of claim 17 wherein said means for imparting a helical flow pattern to the flowing drilling mud comprises:
  shaft means in said drill collar segment having a plurality of openings therethrough; and
  blade means on said shaft means communicating with said openings, said blade means being angularly positioned to impart a helical flow pattern to drilling mud flowing through said openings.

19. The apparatus of claim 17 wherein said means for imparting a helical flow pattern to the drilling mud comprises:
  shaft means in said drill collar segment having a plurality of openings therethrough; and
  nozzle means on said shaft means communicating with said openings, said nozzle means being angularly positioned to impart a helical flow pattern to drilling mud flowing through said openings.

20. The apparatus of claim 17 including:
  sleeve means along said drill collar segment in said annular space to reduce abrasion of said drill collar segment.

21. The apparatus of claim 20 wherein:
  said sleeve means is tungsten carbide.

22. The apparatus of claim 20 wherein:
  said sleeve means is rubber.

23. The apparatus of claim 17 wherein:
  said filter means is comprised of a metal mesh.

24. The apparatus of claim 17 wherein said conical filter means includes:
  means on said filter means exterior to define a plurality of pockets for retaining filtered debris.

25. The apparatus of claim 17 wherein:
  said filter means is conical.

26. Apparatus for catching debris in fluid flowing through a pipe segment comprising:
  means for imparting a helical flow pattern to the fluid wherein said means for imparting a helical flow pattern to the fluid comprises a shaft means in said pipe segment having a plurality of openings therethrough and blade means on said shaft means communicating with said openings, said blade means being angularly positioned to impart a helical flow pattern to fluid flowing through said openings; and
  filter means spaced downstream from said helical flow pattern imparting means, said filter means extending axially along said pipe segment and defining an annular accumulation space between the pipe segment and said filter means, and said filter means having spaced apart first and second open ends.

27. Apparatus for catching debris in fluid flowing through a pipe segment comprising:
  means for imparting a helical flow pattern to the fluid wherein said means for imparting a helical flow pattern to the fluid comprises a shaft means in said pipe segment having a plurality of openings therethrough and nozzle means on said shaft means communicating with said openings, said nozzle means being angularly positioned to impart a helical flow pattern to fluid flowing through said openings; and
  filter means spaced downstream from said helical flow pattern imparting means, said filter means extending axially along said pipe segment and defining an annular accumulation space between the pipe segment and said filter means, and said filter means having spaced apart first and second open ends.

28. An apparatus for catching debris in drilling mud flowing through a drill collar segment comprising:
  means for imparting a helical flow pattern to the flowing drilling mud wherein said means for imparting a helical flow pattern to the flowing drilling mud comprises a shaft means in said drill collar segment having a plurality of openings therethrough and blade means on said shaft means communicating with said openings, said blade means being angularly positioned to impart a helical flow pattern to drilling mud flowing through said openings; and
  filter means spaced downstream from said helical flow pattern imparting means, said filter means extending axially along said drill collar segment and defining an annular accumulation space between the drill collar segment and said filter means, and said filter means having spaced apart first and second open ends.

29. An apparatus for catching debris in drilling mud flowing through a drill collar segment comprising:
  means for imparting a helical flow pattern to the flowing drill mud wherein said means for imparting a helical flow pattern to the drilling mud comprises a shaft means in said drilling collar segment having a plurality of openings therethrough and nozzle means on said shaft means communicating with said openings, said nozzle means being angularly positioned to impart a helical flow pattern to drilling mud flowing through said openings; and
  filter means spaced downstream from said helical flow pattern imparting means, said filter means extending axially along said drill collar segment and defining an annular accumulation space between the drill collar segment and said filter means, and said filter means having spaced apart first and second open ends.

* * * * *